(12) United States Patent
Suda et al.

(10) Patent No.: US 9,052,030 B2
(45) Date of Patent: Jun. 9, 2015

(54) THERMOSTAT DEVICE

(75) Inventors: Hiroshi Suda, Tokyo (JP); Kiyoshi Kadoshima, Tokyo (JP)

(73) Assignee: Nippon Thermostat Co., Ltd., Tokyo (JP)

( * ) Notice: Subject to any disclaimer, the term of this patent is extended or adjusted under 35 U.S.C. 154(b) by 384 days.

(21) Appl. No.: 12/999,315

(22) PCT Filed: Jul. 10, 2008

(86) PCT No.: PCT/JP2008/001841
§ 371 (c)(1),
(2), (4) Date: Dec. 16, 2010

(87) PCT Pub. No.: WO2010/004606
PCT Pub. Date: Jan. 14, 2010

(65) Prior Publication Data
US 2011/0095091 A1   Apr. 28, 2011

(51) Int. Cl.
*F16K 31/02*   (2006.01)
(52) U.S. Cl.
CPC .................................. *F16K 31/025* (2013.01)
(58) Field of Classification Search
CPC ... G05D 23/02; G05D 23/021; G05D 23/022; G05D 23/024; G05D 23/025; G05D 23/27537; G05D 23/1852; G05D 23/275; F16K 31/025
USPC ........................ 236/93 A, 93 R, 95, 99 J, 100
See application file for complete search history.

(56) References Cited

U.S. PATENT DOCUMENTS

| 4,288,033 A * | 9/1981 | Wisyanski ................... 236/93 A |
| 5,129,577 A * | 7/1992 | Kuze ........................... 236/34.5 |
| 2002/0070367 A1 | 6/2002 | Friesenhahn |
| 2002/0096130 A1 | 7/2002 | Fishman |
| 2005/0224592 A1 | 10/2005 | Inoue |

FOREIGN PATENT DOCUMENTS

| FR | 2858678 A1 | 2/2011 |
| JP | 1983-017270 A | 2/1983 |

(Continued)

OTHER PUBLICATIONS

JP 2005 155831 A Machine Translation provided by Japanese Patent Office printed Mar. 2013.*

*Primary Examiner* — Cassey D Bauer
*Assistant Examiner* — Kirstin Oswald
(74) *Attorney, Agent, or Firm* — Orion Consulting; Joseph P. Farrar, Esq.

(57) ABSTRACT

A thermostat device has a thermo element assembly (10) configured by a piston (3), a thermal expansion unit that changes volume with a change in temperature, to reciprocate a cylinder container (4) with respect to the piston, and a heating element (H) that is provided in a casing of the piston and heats the thermal expansion unit (W) when supplied with current. An assembling hole (11) is provided in the device housing to hold an outer end of the thermo element assembly by causing the outer end to pass therethrough toward the outside of the device. A piston guide (13) is provided at a section on the upper end side of the piston configuring the thermo element assembly. An outer end of the piston guide is integrally joined to the housing side while being inserted from the inside of the device housing (2) into the assembling hole to pass therethrough.

1 Claim, 6 Drawing Sheets

(56) References Cited

FOREIGN PATENT DOCUMENTS

| JP | H03-089287 | U |   | 8/1991 |
| JP | H10-220634 | A |   | 8/1998 |
| JP | 2005-155831 | A |   | 6/2005 |
| JP | 2005155831 | A | * | 6/2005 | ............. F16K 31/68 |

* cited by examiner piston casing piston casing piston casing

THERMOSTAT DEVICE

CROSS-REFERENCE TO RELATED APPLICATIONS

The present application is a continuation of PCT/JP2008/001841, filed on Jul. 10, 2008, the entire contents of which are hereby incorporated by reference herein.

BACKGROUND OF THE INVENTION

1. Field of the Invention

The present invention relates to a thermostat device that variably controls the water temperature in a cooling water temperature control system that variably controls the cooling water temperature of, for example, an internal combustion engine ("engine" hereinafter) used in an automobile and the like. More particularly, the present invention relates to an assembly structure of a device housing of a thermo element assembly of the thermostat device.

2. Description of the Related Art

A thermostat device that is disposed in, for instance, a cooling water system of an engine incorporates a wax (thermal expansion unit) that expands/contracts upon detecting a change in temperature of the cooling water within a circulation flow path. The thermostat device functions to open/close a valve unit in response to a change in the volume of the expanding/contracting wax, to keep the cooling water at a predetermined temperature.

As this type of thermostat device, there is known the one with a structure that has, for example, a piston that is installed and fixed within a housing coupled to a plurality of flow paths, a cylinder container that reciprocates with respect to the piston, a thermal expansion unit that is provided within the cylinder container and changes its volume with a change in temperature, to reciprocate the cylinder container, and a heating element that is provided within a casing of the piston and heats the thermal expansion unit when supplied with current, wherein the heating element is configured by an extension member that has thermal conductivity and is formed to pass through the inside of the casing of the piston from the outside of the same, a heating part that is formed inside the extension member on the inside of the casing, and an electrode part that is formed on the extension member on the outside of the casing and is electrically connected to the heating element, and wherein a terminal that supplies voltage to the heating part abuts on the electrode part, so that a voltage supply source and the heating part are electrically connected with each other (see Japanese Patent Application Laid-open No. 2005-155831, for example).

Such a configuration has the following advantages. Since the terminal supplied with voltage is in abutment with the electrode part of the extension member and configured to be detachable with respect to the heating element, the heating element can be assembled and maintained readily. Furthermore, because the heating part of the heating element is formed within the extension member and only the electrode part applied with voltage is formed on the extension member, a highly durable heating element that does not break easily can be obtained. In addition, the heating element provided within the casing of the piston can generate heat substantially evenly from the circumferential surface of the piston, whereby the thermal expansion unit can be heated effectively.

However, in the conventional thermostat device described above, it is troublesome and complicated to assembly the piston, the heating element, the cylinder container, the terminal and the other components to the housing, and such a troublesome work leads to a cost increase.

Moreover, in this conventional device, the piston is inserted into a sealing member and then directly into the housing and held by the metallic materials and elastic rubber. Therefore, such metals as the thermo element and the housing cannot be fixed by press-fitting. Consequently, the flow of the cooling water could tilt the thermo element section especially when the valve is opened. In addition, this conventional device has a reliability problem that a load resulting from the activation of the thermo element or after-mentioned water pressure is applied to the electrically connected section between the terminal of the heater inside the piston and the thermo element section, deteriorating the electrical connection.

SUMMARY OF THE INVENTION

The present invention was contrived in view of such circumstances, and an object thereof is to provide a thermostat device having an excellent operational reliability in the activation thereof, the thermostat device being capable of extremely easily and properly assembling and fixing a thermo element assembly to a device housing and accomplishing easy maintenance.

In order to achieve the above object, a thermostat device according to the present invention (the invention described in claim 1) is a thermostat device, having: a piston that is installed and fixed within a device housing coupled to a plurality of flow paths through which cooling water flows; a cylinder container that reciprocates with respect to the piston; a thermal expansion unit that is provided within the cylinder container and changes its volume with a change in temperature, to reciprocate the cylinder container on the piston; and a heating element that is provided within a casing of the piston and heats the thermal expansion unit when supplied with current, wherein the device housing has an assembling hole for a thermo element assembly configured by the piston and the thermal expansion unit, in order to assemble and hold an outer end of the thermo element assembly by causing the outer end to pass through the assembling hole from the inside of the housing toward the outside, a piston guide is provided at a section on an upper end side of the piston configuring the thermo element assembly, and an outer end of the piston guide is integrally joined to the device housing while being inserted from the inside of the device housing into the assembling hole to pass therethrough.

A thermostat device of the present invention (the invention described in claim 2) is characterized in that, according to the thermostat device described in claim 1, latching means for ensuring the joint between the outer end of the piston guide and the device housing is provided on the outer end side of the piston guide.

A thermostat device of the present invention (the invention described in claim 3) is characterized in that, according to the thermostat device described in claim 2, the latching means is provided on the outer end side of the piston guide such that a space where the entire thermo element assembly can move in an axial direction of the assembling hole is provided when the piston guide is integrally joined to the device housing.

According to the thermostat device of the present invention described above, the piston guide is integrally joined to the device housing, while the outer end of the piston configuring the thermo element assembly is inserted into the assembling hole from the inside of the device housing. Therefore, although this structure is simple, a load applied to a terminal connector provided on the piston can be reduced, and changes in contact resistance caused by a deformation of the terminal connector or a spring material can be eliminated. As a result, the reliability of the electrically connected part increases and the piston can be prevented from swaying.

According to the present invention, the latching means for ensuring the joint between the outer end of the piston guide and the device housing is provided on the outer end side of the piston guide. Therefore, the thermo element assembly can be joined to the device housing more securely.

In addition, according to the present embodiment, a space is provided at the joint section between the latching means and the device housing so that the entire thermo element assembly can move in an axial direction of the assembling hole. This space allows the piston guide on the thermo element assembly side to easily slide in the axial direction within the assembling hole of the device housing, and the piston and the piston guide move integrally along with a valve, thereby eliminating the following problems.

For example, when initial cooling water is injected upon assembling an engine while the conventional thermostat device is mounted in the vehicle, vacuum water injection is usually performed. The problem in this case is that the valve is forcibly pushed down by the pressure of the injection.

Upon the injection of the cooling water mentioned above, only the thermostat main body is pushed down along with the valve, while the piston remains joined to the housing, resulting in a negative pressure in the thermo element, and the cooling water is drawn into the thermo element.

When the cooling water enters the inside of the thermal element, the amount of the wax increases accordingly, and the valve remains open without being able to close completely during the low temperature. As a result, the cooling water flows to the radiator side, causing overcooling and other operational failures.

However, using the latching means of the present invention described above provides an axial allowance (degree of freedom in movement) in a latching part in the axial direction in the joint section between the latching member and the device housing, so that the latching means and the device housing can slide easily. Thus, even when the pressure of the injection of the cooling water is applied to the valve, the entire thermo element assembly moves along with the valve. This prevents the generation of a space or vacuum where only the piston is released, so that the cooling water is not drawn.

REFERENCE NUMERAL

Figure 1:
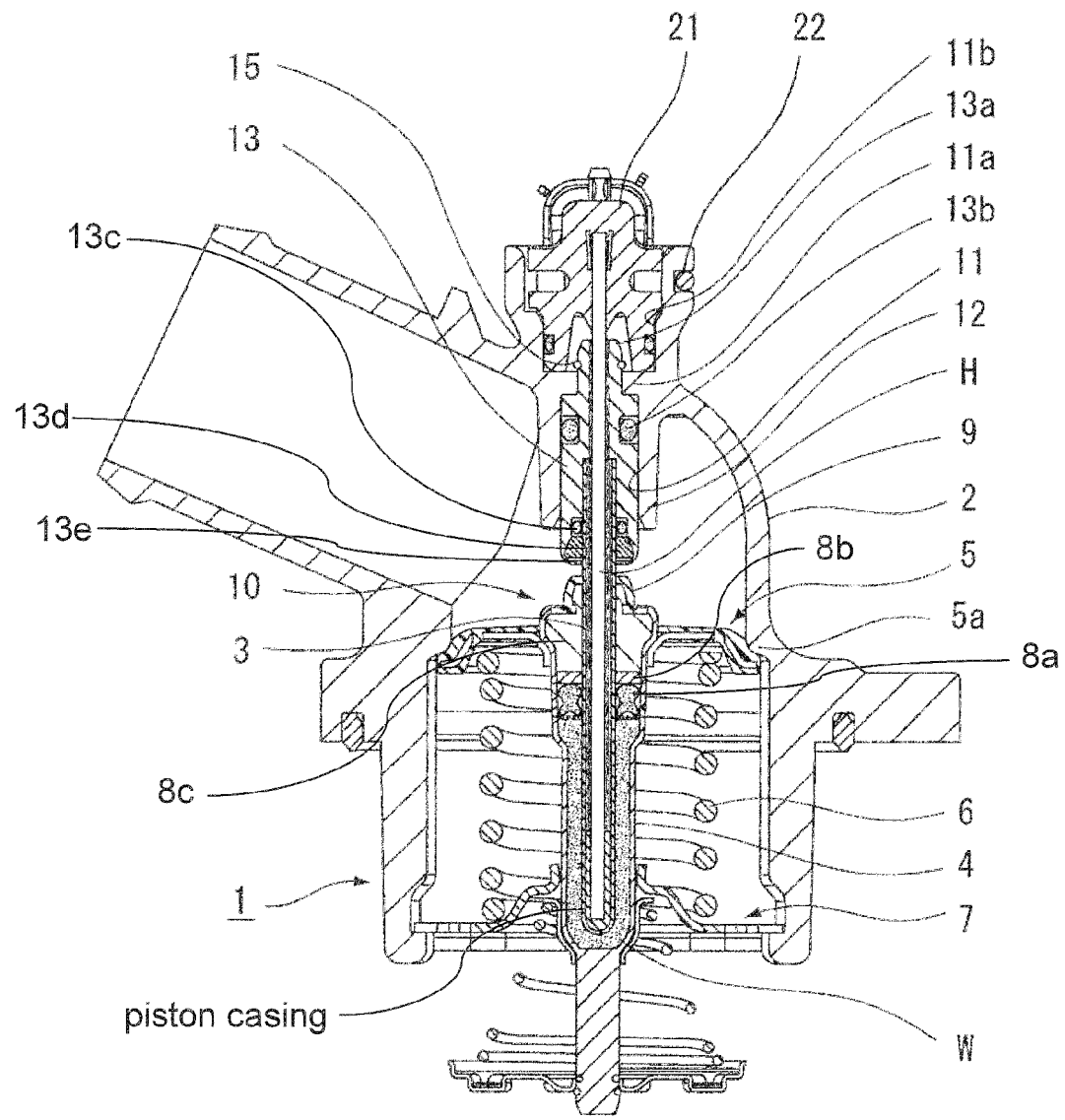
FIG. 1 is a schematic cross-sectional diagram showing the entire configuration of a thermostat device according to the present embodiment.

1. Thermostat device
2. Device housing
3. Piston
4. Cylinder container
10. Thermo element assembly
11. Thermo element assembly assembling hole
13. Piston guide
15. Latching means (stop ring)
21. Connector member
H Heating element (rod heater)
W Wax (thermal expansion unit)

DESCRIPTION OF THE PREFERRED EMBODIMENTS

FIG. 1 shows an embodiment of the thermostat device according to the present invention, wherein a thermostat device represented with a reference numeral 1 is installed in a device housing (simply referred to as "housing" hereinafter) 2 that is coupled to a plurality of flow paths through which cooling water flows. The thermostat device 1 functions to communicate or block the flow paths by operating a valve.

This thermostat device 1 has a piston 3 fixed in a hanging position within the housing 2, and a cylinder container 4 that reciprocates with respect to this piston 3. The thermostat device 1 also has a flange valve 5 formed in an outer circumference of the cylinder container, a spring 6, which wraps around the cylinder container 4 and one end of which abuts with the back side of the flange valve 5, and a lower flange 7, which is formed in an outer circumference of a lower part of the cylinder container 4, and with which the other end of the spring 6 abuts.

The piston 3 is formed into a cylindrical tube of metal with a closed tip end. The cylinder container 4 is fit into an outer circumferential part of the piston 3, whereby a thermo element assembly 10 that seals in a wax W serving as a thermal expansion unit is configured.

When the temperature of the wax W rises, the volume of the wax W expands, and the cylinder container 4 reciprocates such that the piston 3 is stretched. In other words, because the piston 3 is fixed in the housing 2, the cylinder container 4 slides downward, and then the flange valve 5 separates from a valve seat 5a to open.

On the other hand, when the temperature of the wax W is low and the piston 3 contracts, the resilient force of the spring 6 attaches the flange valve 5 to the valve seat 5a by pressure, whereby the flange valve 5 closes.

Here, the cylinder container 4 has a tubular space therein, and the wax W is sealed into a clearance space that is formed by inserting the piston 3 into the tubular space. In the diagram, reference numeral 8a represents a sealing member such as a packing for preventing the wax W from flowing out, reference numeral 8b a backup plate for the sealing member, and reference numeral 8c a tubular guide for holding the piston 3. An opening end rim of the cylinder container 4 is swaged, and a rubber ring 9 for preventing external foreign matters from being mixed in is assembled to a tip end of the opening end rim.

In addition, an assembling hole 11 for assembling the thermo element assembly 10 is formed in the housing 2. This assembling hole 11 has a small-diameter step part 11a on the outer end side thereof, and a large-diameter hole part 11b is formed at an outer end of the same and opened outward in the housing 2. Note that reference numeral 12 is a tubular part for forming the assembling hole 11 within the housing 2.

According to the present invention, a piston guide 13 is provided at an upper end side section of the piston 3. The piston guide 13 is formed into a substantially cylindrical shape by metal or synthetic resin, and integrally fixed to the piston 3 by press fitting or molding.

A small-diameter part 13a is formed on the outer end side of the piston guide 13.

Note that reference numeral 13b is an O-ring that is provided in an outer circumferential part of the piston guide 13 to seal the space between the piston guide 13 and the assembling hole 11. Reference numeral 13c is an O-ring for sealing the space between the piston 3 and the assembling hole 11, and reference numeral 13d a washer, and reference numeral 13e a swaging part for sealing the section of the washer 13d.

The outer end of the piston guide 13 is inserted from the inside of the housing 2 into the assembling hole 11 to pass therethrough, and in this state, a stop ring 15 functioning as retaining latching means is assembled from the outside of the housing 2. In this manner, the housing 2 and the piston guide 13 configuring the thermo element assembly 10 are integrally joined to each other.

Here, this stop ring 15 is provided on the outer end side of the piston guide such as to create a space where the entire thermo element assembly can move in an axial direction of the assembling hole, when the piston guide 13 is integrally joined to the housing 2. This is done in order to absorb the action force generated when the pressure of the fluid flowing through the flow paths inside the housing 2 impacts the assembly of the device.

In other words, using the stop ring 15 described above provides an axial allowance (degree of freedom in movement) in a latching part in the axial direction in the joint section between the stop ring 15 and the housing 2, so that the stop ring 15 and the housing 2 can slide easily. Thus, for instance, even when the pressure of the injection of the cooling water is applied to the valve, the entire thermo element assembly 10 moves along with the valve. This prevents the generation of a space where the piston 3 is released, so that the inside of the thermo element does not enter into a vacuum state and the cooling water is not drawn thereto.

In the diagram, a letter H is a rod heater that is provided within a casing of the piston 3 and functions as a heating element for heating the wax W when supplied with current. The tip end of the piston 3 is sealed with a thermal conductive material such as silicon, which is integrally assembled to the piston 3.

This rod heater H has, as is well known, a structure in which an exothermic wire is buried in a heat-resistant insulator such as a ceramic material.

This rod heater H is inserted into the casing of the piston 3 and electrically connected to an external power source via a controller (not shown), to generate heat according to need and increase the temperature of the wax W. Needless to say, the cylinder container 4 is reciprocated on the piston 3 to control the opening and closing of the valve in the flow paths.

In the diagram, reference numeral 21 represents a connector member for the external connection mentioned above. A tip end part of this connector member is embedded in the large-diameter hole part 11b of the assembling hole 11 and fixed by a stop ring 22, whereby the external connection is accomplished.

It goes without saying that the rod heater H may be configured as the thermo element assembly 10 by being assembled into the piston 3 beforehand, or the rod heater H may be assembled to the connector member 21, and the thermo element assembly 10 may be assembled to the housing 2, which may be then assembled into the piston 3.

Figure 2:
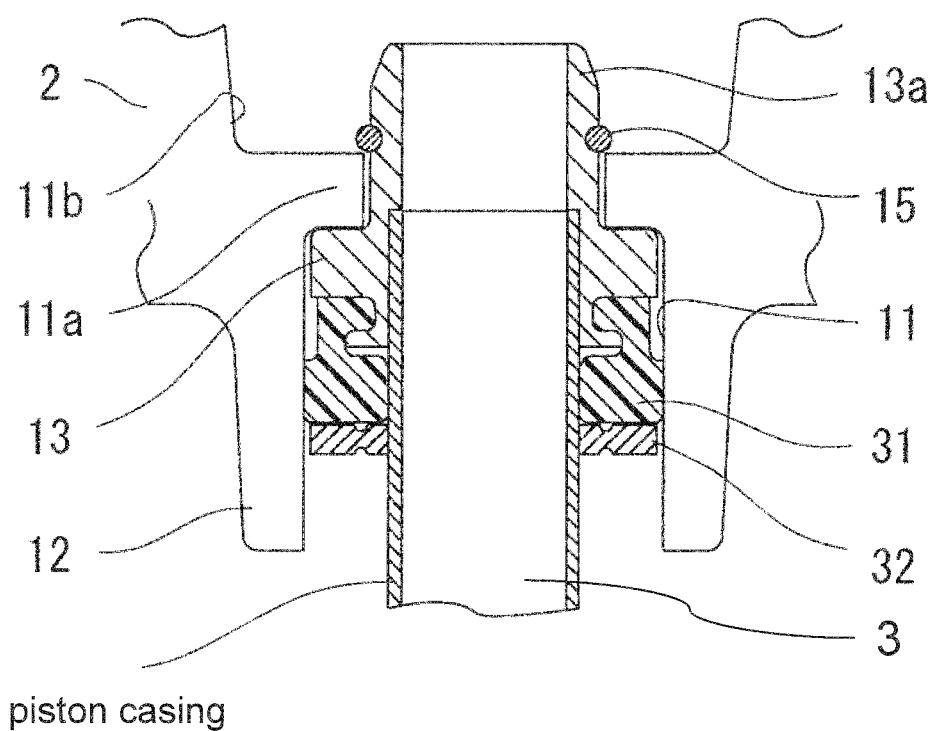
FIG. 2 is an enlarged cross-sectional diagram showing another embodiment of the thermostat device according to the present invention, wherein a relationship among substantial parts such as a piston, piston guide, assembling hole of a device housing and the like is shown.
Figure 3:
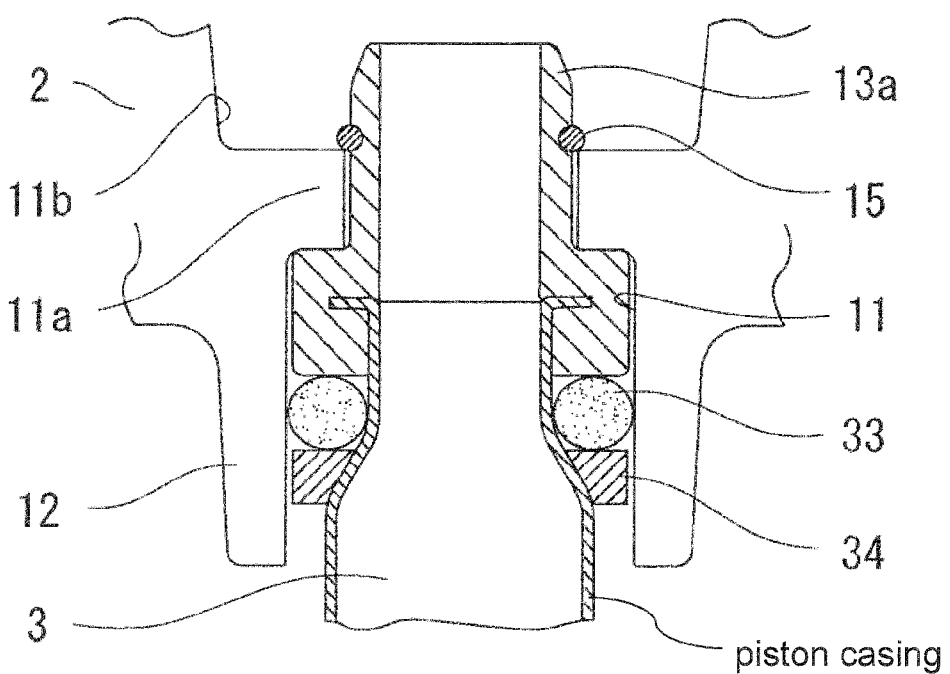
FIG. 3 is an enlarged cross-sectional diagram of the substantial parts, showing yet another embodiment of the thermostat device according to the present invention.

FIGS. 2 and 3 show modifications of the present invention.

Briefly speaking, FIG. 2 shows a situation where a sealing member 31 is provided in the piston guide 13, which is press-fitted and fixed to the piston 3, and a washer 32 is provided in the piston 3 with the sealing member 31 in press-contact therewith, which is then swaged and fixed to the piston 3.

In FIG. 3, the piston 3 is integrated with the piston guide 13 and a ring 34 by means of insert molding. Here, the ring 34 is latched to a step part of the piston 3 and integrated so that the axial movement is regulated. Reference numeral 33 in the diagram represents an O-ring.

Specifically, in the examples shown in FIGS. 2 and 3, the piston 3 and the piston guide 13 are integrated by preventing them from being released, by performing press-fitting, swaging, and insert molding.

Even in this configuration, as with the embodiment described above, the piston guide 13 is integrally joined to the housing 2 while the outer end of the piston 3 configuring the thermo element assembly 10 is inserted into the assembling hole from the housing 2. Therefore, although the configuration is simple, a load applied to a terminal connector provided on the piston 3 can be reduced, and changes in contact resistance caused by a deformation of the terminal connector or a spring material can be eliminated. As a result, the reliability of the electrically connected part increases and the piston can be prevented from swaying.

Furthermore, in the above-described structure as well, the outer end side of the piston guide 13 is provided with the stop ring 15 that functions as the latching means for ensuring the joint between the outer end of the piston guide 13 and the housing 2. Therefore, the thermo element assembly 10 can be joined securely to the housing 2.

Figure 4:
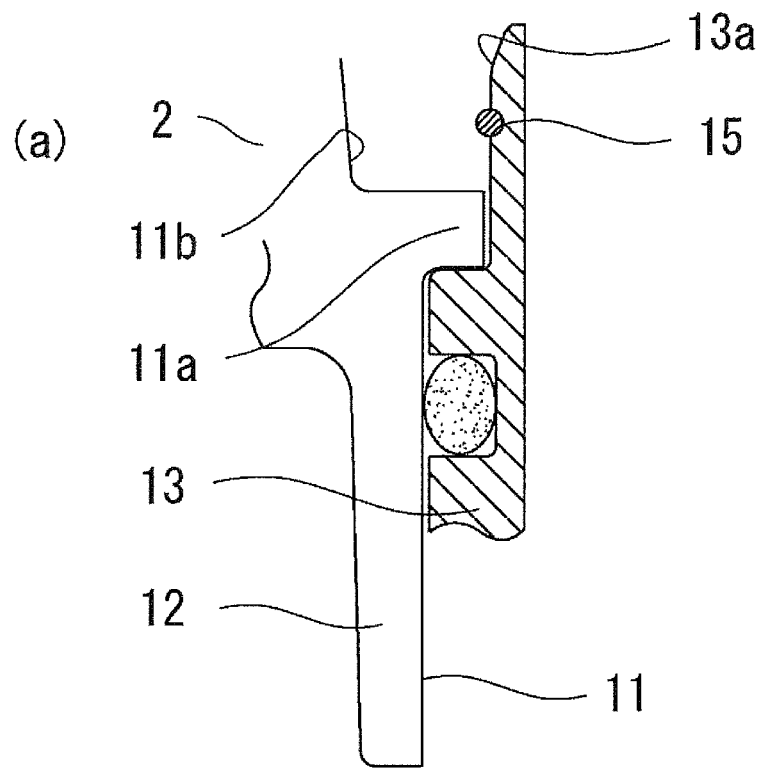
FIGS. 4A and 4B are schematic explanatory diagrams for illustrating a piston guide assembling part within the device housing of the thermostat device according to the present invention.
Figure 4:
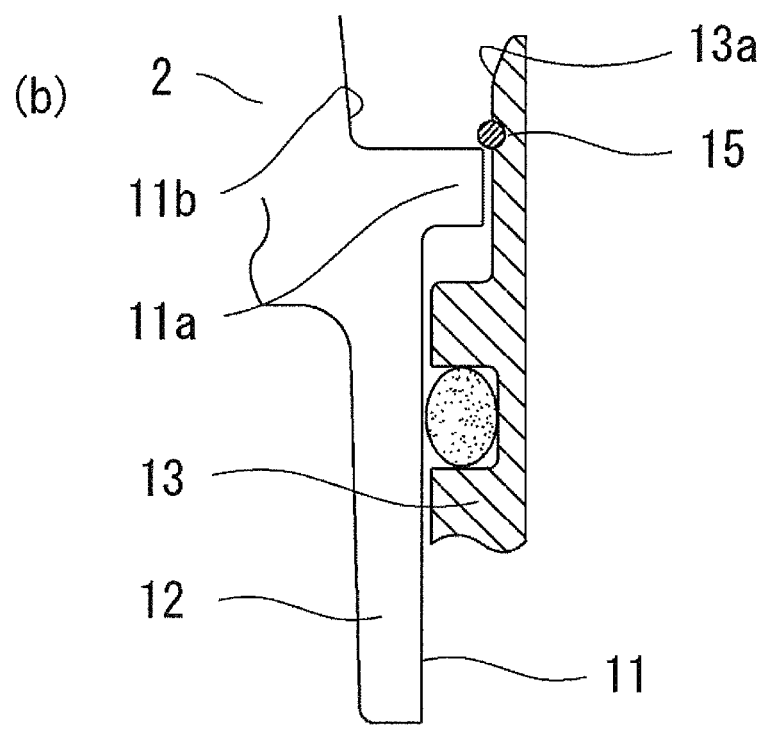

Moreover, in the embodiment described above, the piston guide 13 on the thermo element assembly 10 side is inserted from the inside of the housing 2, and the step part on the tip end side is brought into abutment with the small-diameter step part 11a of the assembling hole 11 of the housing 2 and joined and fixed to the housing 2 side by setting the stop ring 15 on the other side. However, as shown in FIGS. 4A and 4B, a practical advantage can be obtained by providing a space where the entire thermo element assembly 10 can move in the axial direction of the assembling hole 11.

In other words, this configuration allows not only the piston guide 13 on the thermo element assembly side 10 to slide easily within the assembling hole 11 of the housing 2 in the axial direction thereof, but also the piston 3 and the piston guide 13 to move integrally along with the valve, and the stop ring 15 moves until abutting with the small-diameter step part 11a. Thus, the following problems can be prevented.

For example, in the case of injecting the cooling water when assembling an engine, while the conventional thermostat device is attached to the vehicle, the problem here is that the valve is pushed down forcibly by the pressure of the injection. However, such a trouble no longer occurs.

Furthermore, upon the injection of the cooling water as mentioned above, only the thermostat main body is pushed down along with the valve, while the piston remains joined to the housing, resulting in a negative pressure in the thermo element, and the cooling water is drawn into the thermo element. However, such a trouble also no longer occurs.

Moreover, when the cooling water enters the inside of the thermal element, the amount of the wax increases accordingly, and the valve remains open without being able to close completely during the low temperature. As a result, the cooling water flows to the radiator side, causing overcooling and other operational failures. However, this problem can also be prevented.

In addition, according to the configuration described above, an axial allowance is provided between the stop ring 15 and the small-diameter step part 11a of the housing 2, so that the stop ring 15 and the housing 2 can slide easily. Thus, even when the pressure of the injection of the cooling water is applied to the valve, the entire thermo element assembly 10 moves along with the valve. This prevents the generation of a space or vacuum where only the piston 3 is released, so that the cooling water is not drawn.

Note that the present invention is not limited to the structure described using the abovementioned embodiment, and the shapes, structures and the like that configure the thermostat device 1 can be modified/changed accordingly.

Figure 5:
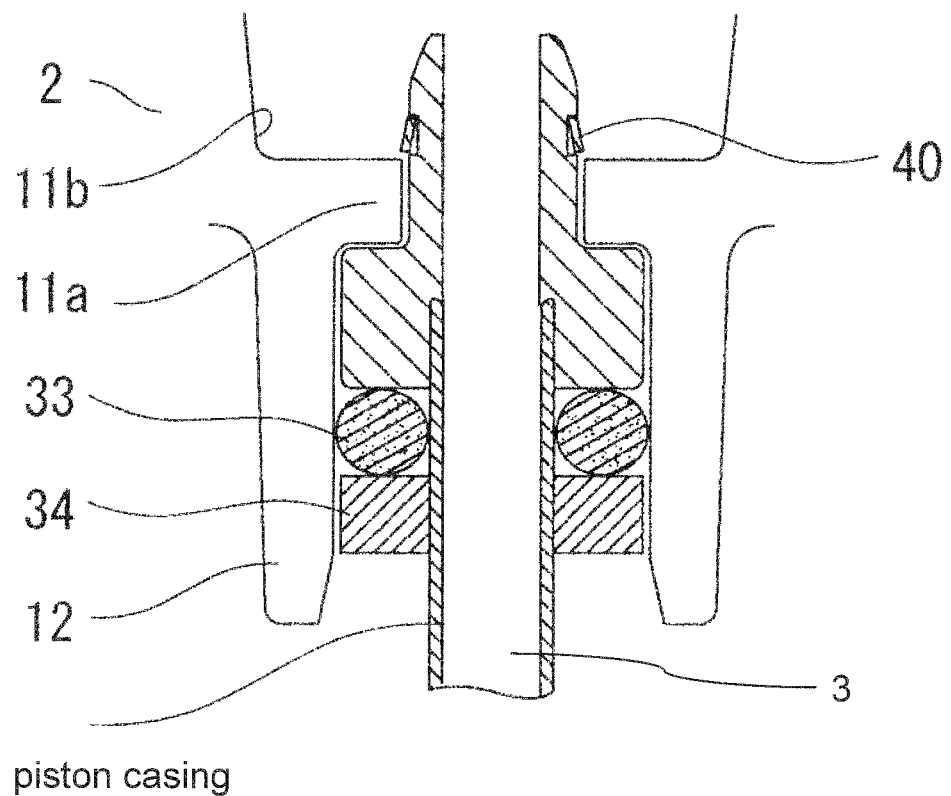
FIG. 5 is an enlarged cross-sectional diagram of the substantial parts, showing yet another embodiment of the thermostat device according to the present invention.
Figure 6:
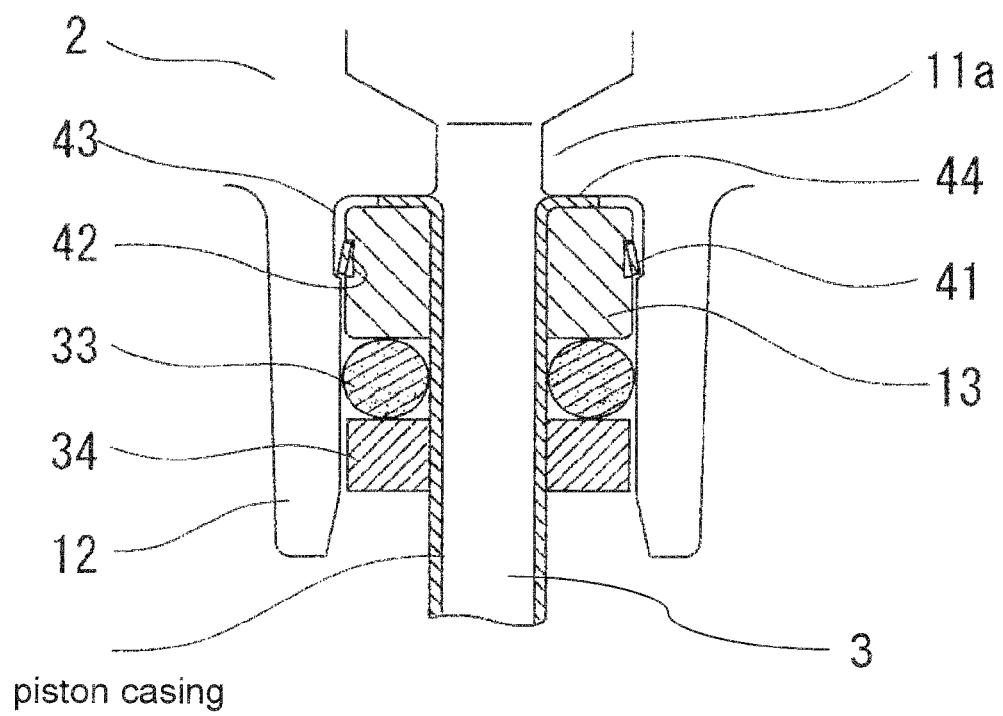
FIG. 6 is an enlarged cross-sectional diagram of the substantial parts, showing yet another embodiment of the thermostat device according to the present invention.

For instance, in the embodiment described above, a general ring with a circular cross-sectional shape is used as the stop ring 15, but the present invention may use not only this stop ring 15 but also stop rings 40, 41 that have the shapes shown in FIGS. 5 and 6, respectively.

In other words, in each of the stop rings 40, 41 the diameter of an upper part is smaller than that of a lower part and the lower part is shaped to have shrinkable spring characteristics on the inside thereof. By using the stop ring 40, 41, the stop ring 40 can be inserted into the assembling hole 11 from the inside of the device housing 2 while being mounted in a mount groove on the outer end side of the piston guide 13, and thereafter the lower part of the stop ring 40 can be latched on the large-diameter hole part 11b side of the small-diameter step part 11a, as shown in FIG. 5. This configuration provides excellent assembly characteristics.

Also, as shown in FIG. 6, a cylindrical piston guide is used as the piston guide 13. A flange-like part 44 provided on the outer end side of the piston 3 is latched to the outer end side of the piston guide 13 in order to securely retain the piston 3. In this embodiment, a mount groove 42 of the stop ring 41 is formed in an outer circumference of the piston guide 13 to mount the stop ring 41 and to latch the stop ring 41 to an inner step part of an annular groove 43 formed within the assembling hole 11 of the housing 2.

What is claimed is:

1. A thermostat device, comprising:
a piston that is installed and fixed within a device housing coupled to a plurality of flow paths through which cooling water flows;
a cylinder container that reciprocates with respect to the piston;
a thermal expansion unit, provided within the cylinder container, that changes volume with a change in temperature, to reciprocate the cylinder container on the piston;
a heating element, provided within a casing of the piston, that heats the thermal expansion unit when supplied with current,
wherein the device housing has an assembling hole for a thermo element assembly configured by the piston and the thermal expansion unit, in order to assemble and hold an outer end of the thermo element assembly by causing the outer end to pass through the assembling hole from the inside of the device housing toward the outside, the assembling hole for the thermo element assembly having a small-diameter step part on an outer end side thereof;
a piston guide is provided at a section on an upper end side of the piston that is configured to be part of the thermo element assembly, the piston guide having a small-diameter portion formed on an outer end side of the piston guide, an outer end of the piston guide being inserted from inside the housing into the assembling hole to pass therethrough to outside of the housing and latch from outside the housing to combine the housing and the piston guide together in a single integrated unit; and
a retainer for securing a joint between an outer end of the piston guide and the device housing, provided on the outer end side of the piston guide,
wherein the retainer is a separate member from the piston guide,
wherein the piston and the piston guide form a single unit and move as a single unit,
wherein the piston guide contacts the small-diameter step part of the thermo element assembly to open a flange valve when the thermo element assembly heats up and operates,
wherein the thermo-element is movable in a range between where the small-diameter step part of the thermo element assembly abuts a projecting portion of the piston guide at one end and the retainer at another end.

* * * * *